(12) United States Patent
Elwood et al.

(10) Patent No.: US 6,975,967 B2
(45) Date of Patent: Dec. 13, 2005

(54) $CO_2/O_2$ INCUBATOR PREDICTIVE FAILURE FOR $CO_2$ AND $O_2$ SENSORS

(75) Inventors: Bryan Elwood, Candler, NC (US); David J. Cartwright, Bonsall Matlock (GB); Earl Robertson, Weaverville, NC (US); Richard H. Bair, III, Asheville, NC (US)

(73) Assignee: Revco Technologies, Inc., Asheville, NC (US)

( * ) Notice: Subject to any disclaimer, the term of this patent is extended or adjusted under 35 U.S.C. 154(b) by 0 days.

(21) Appl. No.: 09/917,904

(22) Filed: Jul. 31, 2001

(65) Prior Publication Data

US 2003/0028354 A1    Feb. 6, 2003

(51) Int. Cl.[7] ............. G06F 11/30; G01N 27/26
(52) U.S. Cl. ............. 702/184; 702/58; 702/81; 702/104; 702/116; 702/182; 73/1.06
(58) Field of Search ............. 702/19, 22–24, 702/57, 59, 81, 85–89, 104, 116, 182–185, 702/58; 73/1.06; 701/34, 109; 600/21–22; 324/464, 465; 204/401

(56) References Cited

U.S. PATENT DOCUMENTS

| | | | | |
|---|---|---|---|---|
| 3,950,985 | A | * | 4/1976 | Buchwald et al. ............. 73/116 |
| 4,701,415 | A | * | 10/1987 | Dutton et al. ............. 435/286.6 |
| 5,736,930 | A | * | 4/1998 | Cappels ............. 340/642 |
| 5,741,413 | A | * | 4/1998 | Capetanopoulos ............. 205/783 |
| 6,279,377 | B1 | * | 8/2001 | Cao ............. 73/23.31 |
| 6,349,268 | B1 | * | 2/2002 | Ketonen et al. ............. 702/130 |
| 6,428,684 | B1 | * | 8/2002 | Warburton ............. 205/775 |
| 6,490,543 | B1 | * | 12/2002 | Jaw ............. 702/184 |
| 2001/0032109 | A1 | * | 10/2001 | Gonyea et al. ............. 705/8 |
| 2002/0075500 | A1 | * | 6/2002 | Kurz et al. ............. 358/1.14 |
| 2003/0014226 | A1 | * | 1/2003 | Loecher et al. ............. 703/2 |

FOREIGN PATENT DOCUMENTS

| | | | | |
|---|---|---|---|---|
| EP | 0180138 A2 | * | 5/1986 | ......... G01N 27/46 |
| JP | 07198672 A1 | * | 8/1995 | ......... G01N 27/41 |
| JP | 08233770 A | * | 9/1996 | ......... G01N 27/26 |
| JP | 08233770 A1 | * | 9/1996 | ......... G01N 27/26 |
| WO | WO-9635944 A1 | * | 11/1996 | ........ G01N 27/416 |

OTHER PUBLICATIONS

Detector Electronics, "Specification Data R8471 Series Gas Controllers." Mar. 1996.*
Apogee, "Oxygen Sensor (Model O2S).", no date.*
General Monitors, "G-Series Portables.", no date.*
General Monitors, "G-Series Portables." http://www.generalmonitors.com/downloads/demos/PORTABLES_DEMO.PDF.*

* cited by examiner

*Primary Examiner*—Hal Wachsman
*Assistant Examiner*—Jeffrey R West
(74) *Attorney, Agent, or Firm*—Baker & Hostetler LLP

(57) ABSTRACT

Methods and apparatus for a predictive warning system of the failure of $O_2$ and $CO_2$ sensors, which are particularly suited for an incubator environment are, disclosed. An application of the predictive failure of $O_2$ and $CO_2$ sensor method and apparatus to incubators is also disclosed. The method and apparatus includes a gas sensor, an embedded controller for analyzing the gas sensor and an interface for indicating a gas sensor failure to a user.

20 Claims, 3 Drawing Sheets

CO₂/O₂ INCUBATOR PREDICTIVE FAILURE FOR CO₂ AND O₂ SENSORS

FIELD OF THE INVENTION

The present invention relates generally to the prediction of failure of sensors within a controlled gas atmosphere enclosure. More particularly the present invention concerns methods and apparatus for the prediction of failure of $O_2$ and $CO_2$ sensors within an incubator environment.

BACKGROUND OF THE INVENTION

There are a number of commercial applications for controlled gas atmosphere enclosures including incubators. For example, electrical components and circuits are often tested in enclosures at a selected temperature and/or relative humidity for a period of time. Another common application for controlled atmosphere enclosures is the growth of biological cultures in a laboratory. As will be discussed herein with regard to a particular embodiment, the present invention may be advantageously employed in connection with a controlled gas atmosphere incubator in which a chamber for biological cultures is heated and in which the atmosphere of the chamber is controlled as to one or more constituent gases and/or the relative humidity.

A typical enclosure of the foregoing type includes a generally cubical outer housing made up of five insulated walls (top, bottom, left side, right side, and rear) and an insulated front door. The door is mounted on hinges on the front of one of the side walls and may be opened to permit access to the interior of the incubator. When the door is closed, it is suitably sealed about its periphery to the housing walls to form the sixth wall of the housing. The incubator chamber, in which biological cultures are grown, is formed by inner walls, inside the insulated outer walls, and typically includes shelves upon which culture containers are placed. The shelves are carried by suitable shelf supports inside the chamber.

Most incubators of this type are either water jacket incubators or forced draft incubators. In a water jacket incubator the inner chamber is heated to the desired temperature by a sealed jacket of water surrounding the five fixed sides of the incubator chamber. The water jacket lies between the chamber wall and the insulated housing walls and is heated by heating elements in thermal contact with the water in the water jacket. Due to the thermal conductivity of water, the heat from the individual heating elements is relatively evenly dispersed through the water in the water jacket, providing even heating of the chamber. Such even heating is desirable in order to provide a uniform temperature for the biological cultures in different areas within the chamber and in order to prevent "cold spots" on the inner chamber wall upon which condensation can form.

Although the heating of the chamber walls in a water jacket incubator is substantially uniform, the chamber atmosphere will stratify thermally if the chamber atmosphere is undisturbed. When such stratification occurs, the temperature of the chamber atmosphere is greater at the top of the chamber than at the bottom of the chamber. In addition, if a constituent gas concentration is maintained in the chamber, such as a particular $CO_2$ level, the constituent gas will also stratify within the chamber atmosphere. Consequently, it is desirable to maintain a certain rate of flow of gas within the chamber to assure uniformity of temperature and of constituent gases. In order to do this, typically a portion of the chamber is separated from the main chamber area by a wall to define a duct extending, for example, along a side of the chamber. A small blower or fan is placed in the duct and the chamber atmosphere is circulated, such as from a duct inlet in the upper portion of the chamber to a duct outlet in a lower portion of the chamber.

In a forced draft incubator, the inner chamber walls are insulated from the outer housing walls by a layer of insulation inside the housing walls. However, in this case there is no water jacket interposed between the insulated outer walls and the inner chamber walls. To obtain heating of the chamber in a forced draft incubator, some type of duct, such as described above, is typically provided within the chamber, and a fan and a heating element are mounted in the duct. As the fan circulates air from the main chamber area through the duct, the circulated chamber atmosphere is heated by the heating element. In order to heat the chamber atmosphere substantially uniformly, and to the desired temperature, considerably greater air flow is required than in the case of a water jacket incubator.

In a typical forced draft incubator, or water jacket incubator, if a constituent gas in the atmosphere of the incubator chamber is to be maintained at a particular level, a probe is introduced into the chamber, perhaps within the duct through which the chamber atmosphere circulates. In the case of $CO_2$, for example, a $CO_2$ sensor is introduced into the incubator chamber to measure the concentration of $CO_2$ therein. A source of $CO_2$ is then coupled to the interior of the chamber through a controlled valve, with an automatic control system actuating the valve as required to maintain the $CO_2$ concentration in the chamber at a selected level.

The humidity in a forced draft incubator is also often controlled. Rather than introducing steam or water into the incubator chamber as may be done in the case of a water jacket incubator, in a forced draft incubator quite often a pan of water is placed upon the floor of the incubator chamber, and the recirculated chamber atmosphere is directed out of the bottom of a duct across the surface of the water in the pan. Due to the higher recirculation rates in a forced draft incubator, appropriate humidification of the chamber is obtained.

In either a forced draft or a water jacket incubator, sensors such as for $CO_2$ or humidity have typically been located within the chamber atmosphere itself, although perhaps within a recirculation duct, as earlier described. Such sensors in the chamber are subject to the chamber atmosphere, and a sensor can fail or suffer performance degradations due to contaminants or the accumulation of a coating on the sensor. The presence of such sensors in the incubator chamber itself also makes cleaning of the chamber interior more difficult. In fact, the very existence of a duct or the like for the circulation of the chamber atmosphere within the chamber introduces difficulties in cleaning the chamber.

The recirculation of the chamber atmosphere, such as through a duct, in either type of incubator presents yet another problem, that of potential contamination of biological cultures within the chamber. Contaminants such as mold spores are almost invariably present in the chamber atmosphere and may be directed by the recirculatory air flow into the biological culture containers. Culture contamination problems are exacerbated by the higher air flows required in forced draft incubators.

Higher air flow rates involved in forced draft incubators have a further disadvantage in that the higher flow rates tend to dry out biological culture media. To a large degree, the necessity of offsetting this desiccation results in the requirement for humidity control in forced draft incubators. In such incubators, a relatively high humidity is maintained so that the drying effect of the gas flow is ameliorated.

Furthermore, a well known problem with incubator systems is that it is difficult to know when a pending failure of the $O_2$ and $CO_2$ sensors may occur. Incubators are typically used for growing cultures in a controlled environment wherein both temperature and atmospheric gas concentration are maintained at selected levels. For certain applications it is highly desirable to have both temperature and gas concentrations maintained within strict tolerances while still allowing easy access to the incubator chamber for adding or removing items to and from the chamber or for inspecting the contents of the chamber. Control of environmental variables is desirable to maintain accuracy and reproducability of incubation results.

Therefore, it would be desirable to provide an incubator having the ability to provide a warning of a pending failure of the $O_2$ and $CO_2$ sensors mounted therein.

SUMMARY OF THE INVENTION

The foregoing needs have been satisfied to a great extent by the present invention wherein, this invention includes the formulation of algorithms utilized for early warning of $O_2$ and/or $CO_2$ sensors. The algorithms are included in the firmware for an embedded controller and operate to analyze the sensors for lifetime adjustment every hour as determined by the cumulative clock within the controller. As an hour roll-over occurs, the sensor lifetime value is adjusted and normalized to an hour count stored in % $O_2$ lifetime hours used at 20° C. The normalization includes assumptions that the $O_2$ concentration and the $O_2$ sensor temperature remained constant over the previous hour.

It is accordingly an object of the present invention to provide a predictive warning system of pending sensor life failure.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
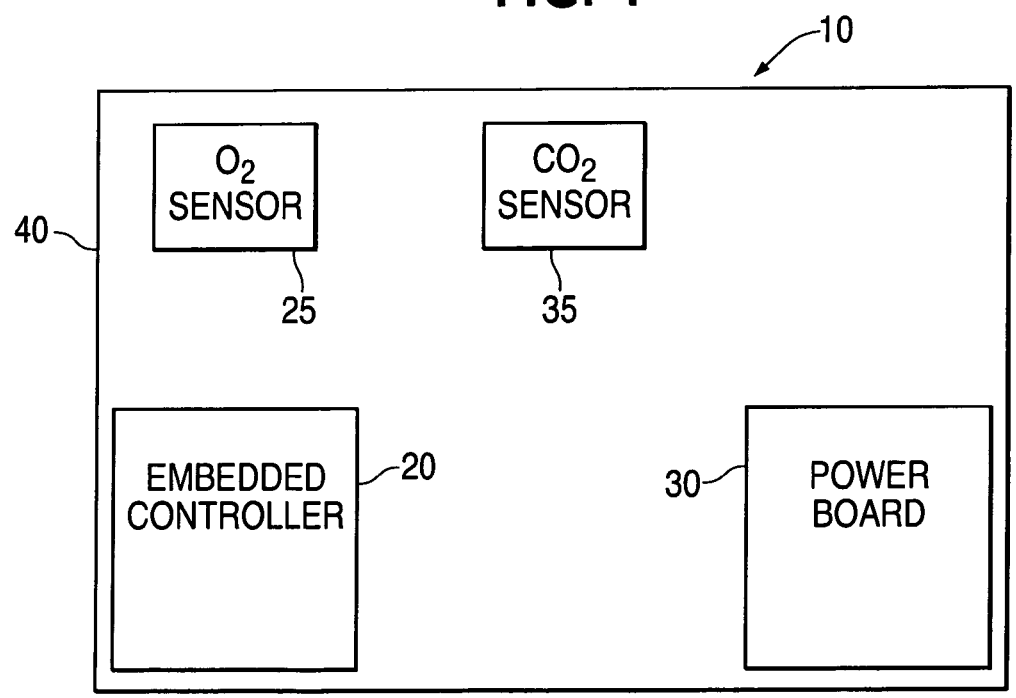
FIG. 1 is a block diagram of a preferred embodiment of the present invention showing a microcontrolled system with $O_2$ and $CO_2$ sensors, an embedded controller and a power board.

Referring now to the figures, FIG. 1 illustrates a microcontroller based system 10, an embedded controller 20, $O_2$ sensor 25, $CO_2$ sensor 35, and a power board 30 which are set in an incubator cabinet 40. This microcontroller based system 10 has the ability to track the $O_2$ and the $CO_2$ set point, in percentage, along with the operation time. $O_2$ sensor 25 may be specified to perform for 900,000 $O_2$ percentage hours. Thus, it is a straightforward calculation to determine how close the system is Coming to 900,000 $O_2$ percentage hours. In the case of a $CO_2$ sensor 35, for example, the $CO_2$ sensor 35 can be introduced into the incubator cabinet 40 to measure the concentration of $CO_2$ present therein. A source of $CO_2$ (not shown) is then coupled to the interior of the incubator cabinet 40 through a controlled valve (not shown), with an automatic control system (not shown) which may include the embedded controller 20 actuating the valve as required to maintain the $CO_2$ concentration in the incubator cabinet 40.

Such sensors as the $O_2$ sensor 25 and $CO_2$ sensor 35 in an incubator cabinet 40 may be subject to the incubator cabinet 40 internal atmosphere, and these sensors can fail or suffer performance degradations due to contaminants or the accumulation of a coating on the sensor over time.

Figure 2:
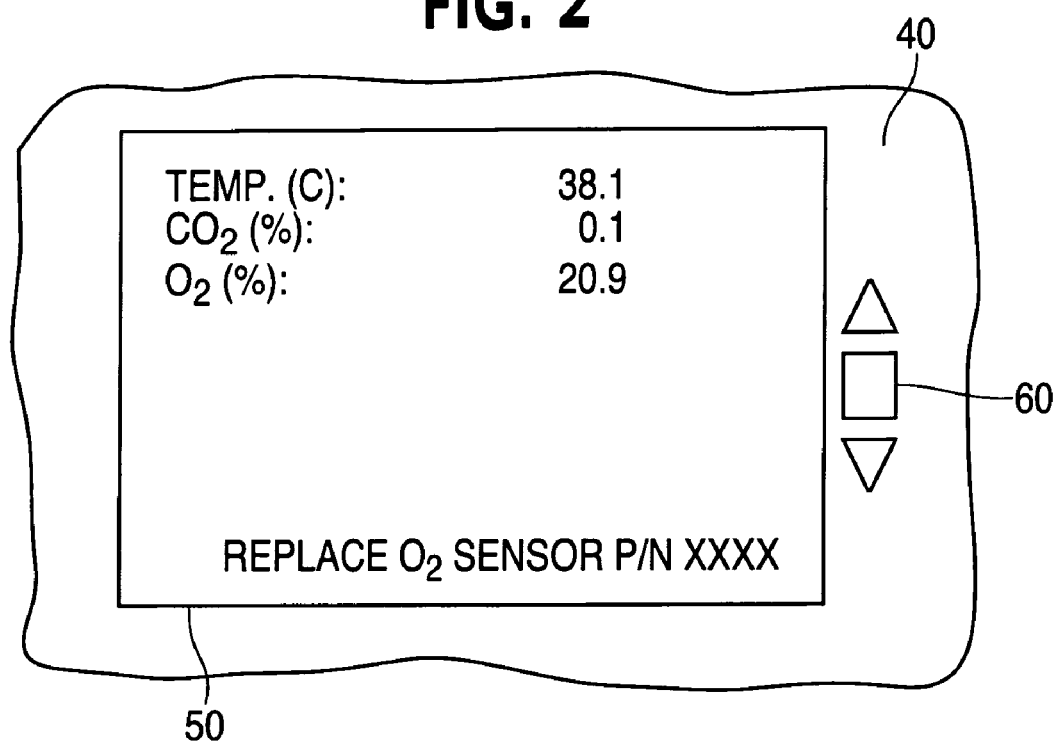
FIG. 2 shows a user interface indicating the variables of temperature, $CO_2$ and $O_2$ in an incubator environment.

Referring to FIG. 2, it would be highly beneficial to the user to be forewarned of this pending threshold. For instance, at some predetermined value, say 800,000 $O_2$ percentage hours, the user would begin to see a warning on interface display 50, such as "Replace $O_2$ sensor, P/N XXXXXX."

A similar scenario holds true for $CO_2$ sensor 35 with respect to percentage hours and lifetime use. The main difference between $CO_2$ sensor 35 from the $O_2$ sensor 25 is that the operational life would be based on the warranty period of the $CO_2$ sensor 35: the time that it is guaranteed to operate correctly by the manufacturer. Again, the system is capable of tracking the operation time of $CO_2$ sensor 35 as well.

Similar interface display 50 notices will also be provided for re-calibration times for both sensors.

$O_2$ Sensor Life Detailed Example

The $O_2$ sensor lifetime is dependent on two variables, temperature, and $O_2$ concentration. Interfacing an $O_2$ sensor 25 to an embedded controller 20 designed to control temperature and $O_2$ (among other parameters) as aforementioned allows the lifetime usage of the sensor to be monitored and ultimately can warn a user of impending sensor replacement. The preferred embodiment analyzes the sensor for lifetime adjustment every hours a determined by the cumulative clock within the controller 20. As the hour roll-over occurs, the senor lifetime value is adjusted and normalized to an hour count stored in % $O_2$ lifetime hours used at 20° C. The normalization includes assumptions that the $O_2$ concentration and the $O_2$ concentration and the $O_2$ sensor temperature remained constant over the previous hour. Although this assumption may at fist appear invalid, 1) an incubator application typically holds parameters constant for long periods of time, 2) it is easily adapted to a different application, and 3) the $O_2$ sensor life hours count is a large number (thus if small numbers of the hour roll-overs are inaccurate it will not effect the final result). The following cod snippet is an excerpt from the firmware in the embedded controller 20 that executes every hour to increase the $O_2$ sensor lifetime:

Code Snippet (executes every hour):
O2SensorLifeUsed20C=+=(FLOAT)(((FLOAT)O2Act/ 10.0))*((float)(100.0/(1192.0/(exp(2.0+(0.0239* (Temp/10 0))))))));
O2Act=10*percentage O2
Temp=10*temperature (° C.).

EXAMPLE:

O2Act=250 (25% $O_2$)
Temp=10*temperature (°C)
O2SensorLifeUsed+=37.523

Therefore, for this particular hour adjustment the sensor life utilized over the last hour was 37.523 for the sensor at 25% $O_2$ and 37.0° C. It should be noted that the transfer function above may be different for other $O_2$ sensors 25 and that the preferred embodiment utilizes self-powered, diffusion limited, metal-air battery types.

At this point the embedded code could compare the variable O2SensorLifeUsed20C with another variable that represents the total % $O_2$ lifetime hours used at 20° C. When the O2SensorLifeUsed20C is greater than the % $O_2$, it is time to replace the sensor and the system can respond through the interface display 50.

In an actual application, the number may be padded to allow for time for the user of the device to receive a warning prior to expiration. Furthermore, the embedded user interface display 50 should allow a reset interface 60 to re-zero the count for in the field sensor replacement.

Figure 3:
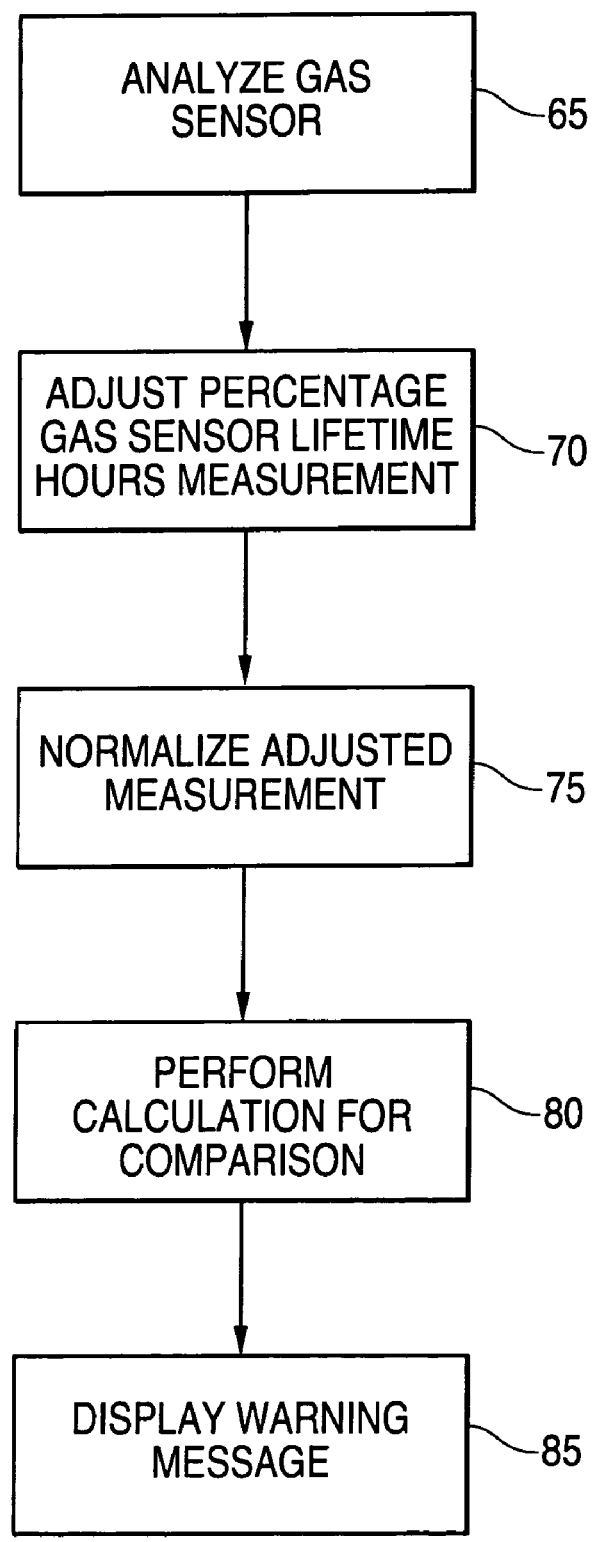
FIG. 3 shows a flow diagram of a preferred embodiment of predicting failure of gas sensors.

Thus, FIG. 3 depicts a preferred method of predicting failure of gas sensors in an incubator environment which may comprise an algorithm for analyzing gas sensors 65 for a lifetime adjustment. The invention provides for an adjustment in a percentage gas sensor lifetime hours measurement for the gas sensor 70. The adjusted measurement of the gas sensor may further include a normalization 75, for instance, to an hour count stored in percent $O_2$ lifetime hours preferably used at 20° C. Hence, a measurement for the sensor of a percentage lifetime hours used may be calculated 80 for comparison with a maximum percentage hours for the gas sensor as described earlier. Finally, a display warning 85 may be issued to a user.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A predictive warning system for incubator gas sensor failure, comprising:
at least one gas sensor disposed in an incubator housing;
an embedded controller for analyzing the at least one gas sensor for failure by adjusting a percentage gas sensor lifetime hours measurement for the at least one gas sensor;
means for normalizing the adjusted percentage gas sensor lifetime hours measurement of the at least one gas sensor;
means for holding a gas concentration and a gas sensor temperature constant over a previous hour prior to performing the normalizing;
means for calculating a measurement for the at least one gas sensor of a percentage lifetime hours used for comparison with a respective maximum percentage hours for the at least one gas sensor, wherein the adjusted percentage gas sensor lifetime hours measurement of the at least one gas sensor is normalized, in said embedded controller, to an hour count stored as a percentage measurement of lifetime hours used at a temperature of 20 degrees Celsius; and
an interface display for predicting failure of the at least one gas sensor to a user.

2. The predictive warning system of claim 1, wherein said embedded controller tracks $O_2$ and $CO_2$ values by percentage.

3. The predictive warning system of claim 1, wherein said interface display is resettable.

4. The predictive warning system of claim 1, wherein said embedded controller tracks $O_2$ and $CO_2$ operation times.

5. The predictive warning system of claim 1, wherein said embedded controller adjusts the percentage gas sensor lifetime hours measurement every hour.

6. The predictive warning system of claim 5, wherein said interface display indicates a warning message to said user once the percentage gas sensor lifetime hours used measurement exceeds a percentage of said respective maximum percentage hours of the at least one gas sensor.

7. The predictive warning system of claim 6, wherein the at least one gas sensor is an $O_2$ sensor.

8. The predictive warning system of claim 6, wherein the at least one gas sensor is a $CO_2$ sensor.

9. A method of predicting failure of gas sensors in an incubator environment comprising the steps of:
analyzing at least one gas sensor for lifetime adjustment;
adjusting a percentage gas sensor lifetime hours measurement for the at least one gas sensor;
normalizing the adjusted percentage gas sensor lifetime hours measurement of the at least one gas sensor;
holding a gas concentration and a gas sensor temperature constant over a previous hour prior to performing the normalizing step;
calculating a measurement for the at least one gas sensor of a percentage lifetime hours used for comparison with a respective maximum percentage hours for the at least one gas sensor;
repeating the adjusting step every hour as determined by a cumulative clock in an embedded controller, wherein the adjusted percentage gas sensor lifetime hours measurement of the at least one gas sensor is normalized, in said embedded controller, to an hour count stored as a percentage measurement of lifetime hours used at a temperature of 20 degrees Celsius; and
displaying a warning message to a user.

10. The method of claim 9, wherein the embedded controller tracks $O_2$ and $CO_2$ values by percentage.

11. The method of claim 9, wherein the step of displaying a warning message to a user occurs once the percentage gas sensor lifetime hours used measurement exceeds a percentage of said respective maximum percentage hours for the at least one gas sensor.

12. The method of claim 9, wherein the embedded controller tracks $O_2$ and $CO_2$ operation times.

13. The method of claim 9, wherein said gas sensor is an $O_2$ sensor.

14. The method of claim 9, wherein said gas sensor is a CO2 sensor.

15. A predictive warning system for incubator gas sensor failure, comprising:
- means for analyzing at least one gas sensor for lifetime adjustment;
- means for adjusting a percentage gas sensor lifetime hours measurement for the at least one gas sensor;
- means for normalizing the adjusted percentage gas sensor lifetime hours measurement of the at least one gas sensor;
- means for holding a gas concentration and a gas sensor temperature constant over a previous hour prior to performing the normalizing;
- means for calculating a measurement for the at least one gas sensor of a percentage lifetime hours used for comparison with a respective maximum percentage hours for the at least one gas sensor;
- means for adjusting the percentage gas sensor lifetime hours measurement every hour, wherein the adjusted percentage gas sensor lifetime hours measurement of the at least one gas sensor is normalized, in an embedded controller, to an hour count stored as a percentage measurement of lifetime hours used at a temperature of 20 degrees Celsius; and
- means for displaying a warning message to a user once the percentage gas sensor lifetime hours used measurement exceeds a percentage of said respective maximum percentage hours for the at least one gas sensor.

16. The predictive warning system of claim 15, wherein said embedded controller tracks $O_2$ and $CO_2$ values by percentage.

17. The predictive warning system of claim 15, wherein said embedded controller tracks $O_2$ and $CO_2$ operation times.

18. The predictive warning system of claim 15, wherein said means for displaying a warning message to a user is resettable.

19. The predictive warning system of claim 15, wherein the at least one gas sensor is an $O_2$ sensor.

20. The predictive warning system of claim 15, wherein the at least one gas sensor is a $CO_2$ sensor.

* * * * *